United States Patent

[11] 3,630,602

[72] Inventor John Frederick Herbert
605 Ashbourne Road, Elkins Park, Pa. 19117
[21] Appl. No. 34,185
[22] Filed May 4, 1970
[45] Patented Dec. 28, 1971

[54] CONTACT LENS
3 Claims, 3 Drawing Figs.

[52] U.S. Cl. .................................................. 351/16, 350/96 B, 351/160
[51] Int. Cl. ....................................................... A61b 3/10, G02c 7/04, G02b 5/14
[50] Field of Search .................................... 351/1, 6, 16, 160; 350/96 B

[56] References Cited
UNITED STATES PATENTS
3,001,441 9/1961 Herbert .................. 351/16
1,548,780 8/1925 Herbert, Jr. .............. 351/9
1,605,725 11/1926 Herbert, Jr. .............. 351/7

OTHER REFERENCES
J. G. F. Worst, " Goniotomy Lens With Internal (Fiber) Illumination," Amer. J. Opthalmology, Vol. 65, No. 2, pp. 251–254 Feb. 1968

Primary Examiner—David Schonberg
Assistant Examiner—Paul A. Sacher
Attorney—Zachary T. Wobensmith, II ABSTRACT: A contact lens is provided having an illuminator with high light input without heating effect and which is particularly suited for illumination of the interior of the eye for examination of the eye and photography of the eye.

PATENTED DEC 28 1971 3,630,602
FIG.1
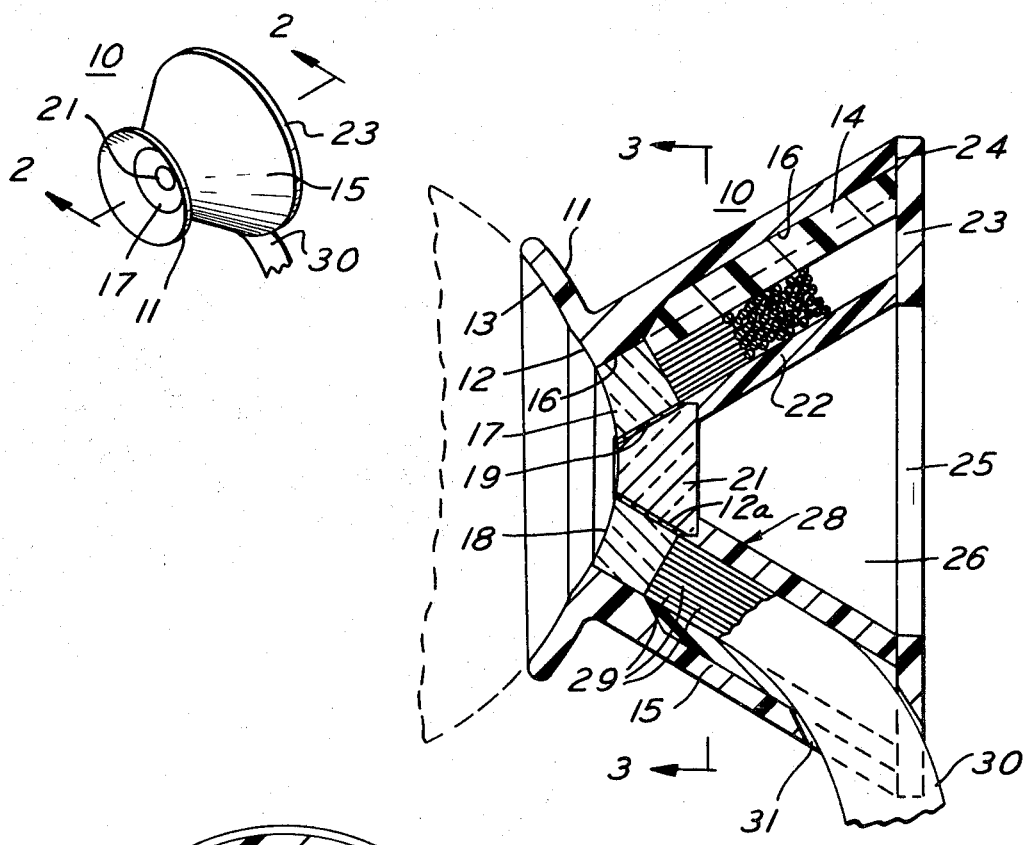
FIG.2
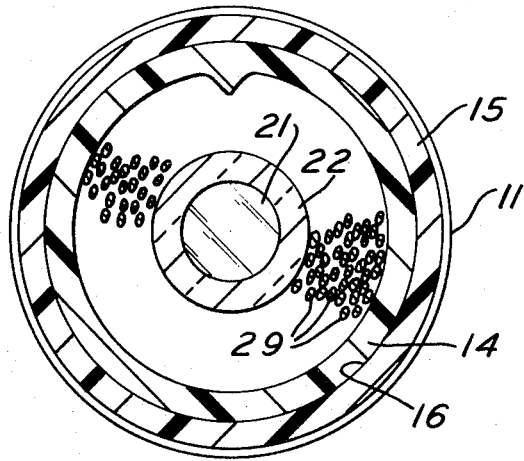
FIG.3
INVENTOR
JOHN FREDERICK HERBERT
BY
*B.T. Wolensmith*
ATTORNEY

CONTACT LENS

BACKGROUND OF THE INVENTION

1. Field of the Invention

This invention relates to contact lens and more particularly to an improved contact lens with interior illumination of the eye for examination and photography of the eye.

2. Description of the Prior Art

It has heretofore been proposed to employ contact lens for examination and photography of the eye and to associate with the lens light sources for illumination of the eye. My prior U.S. Pat. Nos. 1,548,780, 1,605,725 and 3,001,441, show structures of this nature but the light sources are such that excessive heating occurs which imposes severe limitations on the period available for use. The distribution of the light from the plurality of lamps is also not uniform.

It has also been proposed in the U.S. Pat. to Peck, No. 3,068,745 to provide slit lamp apparatus for microscopic examination of the eye which utilized a wide but thin beam of light having a smooth well-defined edge and to employ a fiber optical device for this purpose. The nature of the beam limited the light input into the eye.

SUMMARY OF THE INVENTION

In accordance with the invention a contact lens is provided for eye examination and eye photography having a central lens with cold light input to the eye therearound of substantially uniform character, the light input being attained by a fiber optical input system to an annular transparent band disposed around the lens.

It is the principal object of the present invention to provide an illuminated contact lens having a cold light input of high intensity which is simple in construction, and is free from the likelihood of operating difficulties and improper light reflections.

Other objects of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is an external view in perspective of a contact lens in accordance with the invention;

FIG. 2 is a longitudinal sectional view, enlarged, taken approximately on the line 2—2 of FIG. 1; and FIG. 3 is a transverse sectional view, taken on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, a holder 10 is provided which is preferably molded of light weight opaque synthetic plastic or rubber.

The holder 10 has a flared rim 11 with an interior concave surface 12 for engagement with the cornea of the eye and a surface 13 therearound for engagement with the eyeball outwardly of the surface 12.

The holder 10 has a hollow frustoconical body portion 15 with an interior frustoconical surface 16 with which a retainer sleeve 14 is disposed. Interiorly of the sleeve 14 a hollow generally conical light transfer ring 17 is provided of transparent or translucent synthetic plastic material. The ring 17 has a smooth inner surface 18 also for engagement with the cornea of the eye and continuous with the surfaces 12 and 13 and also has a frustoconical surface 19.

Within the ring 17 a contact lens 21 is fixedly mounted and retained in place by an opaque hollow frustoconical shield 22, also preferably of synthetic plastic or rubber. The lens 21 has an opaque coating 12a to prevent light transfer. The lens 21 can serve as a projecting lens as hereinafter explained.

An end plate 23 is provided, secured to the rear margin 24 of the body portion 15 in any desired manner, such as by a suitable adhesive (not shown).

The end plate 23 has a central opening 25, communicating with a frustoconical space 26 within the shield 22, so that the image from the lens 21 can be projected therethrough and onto a screen or wall (not shown) for visual inspection or for photography, if a permanent record is desired.

The body portion 15, ring 17, shield 22 and end plate 23 provide a space for the supply of light to the ring 17 by a fiber optical system 28 which includes a multiplicity of continuous light conducting fibers 29, tapered or not as desired, and in a plurality of bundles if desired, but enclosed within an outer cover 30 which extends through an opening 31 in the body portion 15 and plate 23.

The fibers 29, as they extend inwardly through the opening 31 are disposed in advancing successive curved and spiral paths on each side of gradual curvature so as not to involve an excessive acuity of angle of the fibers 29.

Any suitable light source (not shown) but preferably shielded may be employed for light input and to which the fibers 29 in the cover 30 extend for this purpose. The fibers 29 can be such as are described in U.S. Pat. Nos. 2,825,260 to B. O'Brien, 2,992,516 to F. H. Norton, and 3,068,745 to W. F. Peck.

The fibers 29 are preferably adhesively or otherwise held with their termini in contact with the ring 17 for transfer of light thereto from the light source.

The mode of operation will now be pointed out.

The holder 10 is positioned on the eyeball with the contact lens 21 centered on the cornea.

The light source (not shown) may then be activated to transmit light along the fibers 29 to the light transfer ring 17 and therefrom into the interior space of the eye for transmission of an image of the interior of the eye through the lens 21. The image may be projected onto a screen for observation or for photographing or the photographic equipment may be set up to directly record the image made available by the lens 21.

The separation of the light source from the eye avoids objectionable heating of the holder 10 and of the eye and permits of prolongation of the period of examination with ample time for photographic recording in a manner not heretofore possible.

I claim:

1. Illuminating apparatus for a contact lens comprising
   a holder having a flared rim and a flared body portion extending from said rim,
   said rim having an eye contacting surface thereon,
   said body portion having mounted therein a hollow generally conical light transfer ring with an eye-contacting surface continuous with said eye contacting surface of said rim,
   said ring having a lens centrally disposed therein with an eye contacting surface continuous with the eye contacting surface of said transfer ring, and
   means for illuminating the interior of an eye with which said transfer ring is in engagement,
   said means comprising a fiber optical system which includes
      a light source,
      a multiplicity of continuous light conducting fibers connected to said light source enclosed within a cover extending through said body portion and advancing in successive curved and spiral pattern to uniform terminal engagement with said transfer ring.

2. Illuminating apparatus as defined in claim 1 in which said holder has mounted therein a light opaque sleeve in retaining relation to said transfer ring.

3. Illuminating apparatus as defined in claim 1 in which said holder has mounted therein a light opaque shield in retaining relation to said lens.

* * * * *